United States Patent [19]

Lisle et al.

[11] Patent Number: 5,665,169

[45] Date of Patent: Sep. 9, 1997

[54] SCRAPING TOOL AND METHOD OF USE

[75] Inventors: John C. Lisle; Randall J. Ploeger, both of Clarinda, Iowa

[73] Assignee: Lisle Corporation, Clarinda, Iowa

[21] Appl. No.: 620,705

[22] Filed: Mar. 21, 1996

[51] Int. Cl.$^6$ .............................. B08B 1/00; A47L 13/02
[52] U.S. Cl. ............................ 134/6; 15/143.1; 15/236.01; 15/236.05; 30/169; 30/171; 30/172; D32/49
[58] Field of Search .......................... 15/143.1, 236.01, 15/236.05–236.09; 30/169, 171, 172; 134/6; D32/46–49

[56] References Cited

U.S. PATENT DOCUMENTS

| | | | |
|---|---|---|---|
| 1,145,966 | 7/1915 | Bergmann | 15/143.1 X |
| 1,523,579 | 1/1925 | Brower | 30/169 |
| 1,995,959 | 3/1935 | Blum | 30/169 X |
| 2,092,878 | 9/1937 | Hess | 15/236.01 X |
| 2,273,561 | 2/1942 | Cenis | 15/236.01 X |
| 2,556,797 | 6/1951 | Carlson | 15/236.01 |
| 2,824,323 | 2/1958 | Tos et al. | 15/236.09 X |
| 4,542,553 | 9/1985 | Cary | 15/143.1 X |

FOREIGN PATENT DOCUMENTS

| | | | |
|---|---|---|---|
| 232247 | 3/1911 | Germany | 15/236.05 |
| 151620 | 5/1932 | Switzerland | 30/172 |
| 176551 | 6/1935 | Switzerland | 15/236.06 |

OTHER PUBLICATIONS

Lisle Corporation, Catalog T-52, #51000 Heavy Duty Scraper, 1994.
TMT Company, Gasket Getter.
Cal-Van Tools, Catalog 9500, #350 Heavy Duty Gasket Scraper, Jan., 1995.
CTA Manufacturing Corp., Catalog 93-9, #2080 Gasket Scraper, 1993.
K-D Tools, Catalog 89007-06, #485 Gasket Scraper, Mar., 1992.
Old Forge Tools, Catalog 10/95, p. 70, Oct., 1995.
Plews Tools, Catalog #90-560, #72-433 Gasket Scraper, Mar., 1991.
RIMAC Tools & Equipment, Catalog 90, #2910 Scraper Set.
VIM Tools, Catalog 394, #C1 Carbon Scraper.

*Primary Examiner*—Mark Spisich
*Attorney, Agent, or Firm*—Banner & Witcoff, Ltd.

[57] ABSTRACT

A scraper tool includes a handle with an axial shaft with a bend connecting the shaft to a parallel shaft extension that has a triangular carbide blade attached thereto. The tool may be manual gripped by both hands of an operator simultaneously for scraping cylinder blocks.

4 Claims, 1 Drawing Sheet

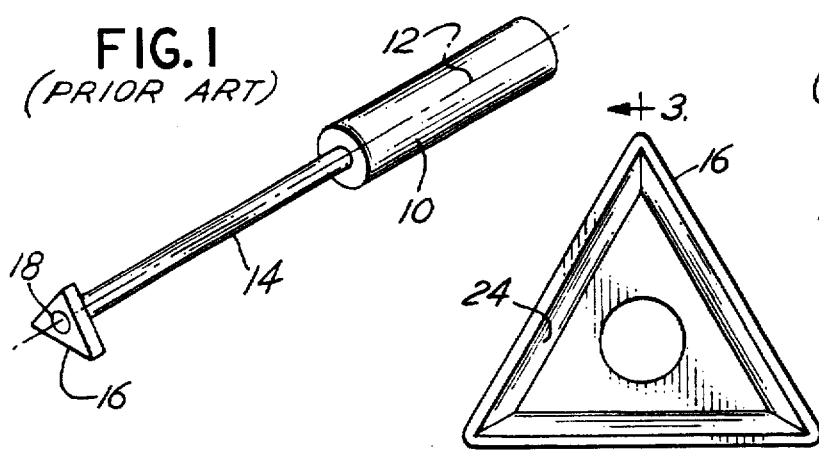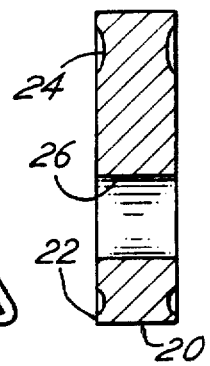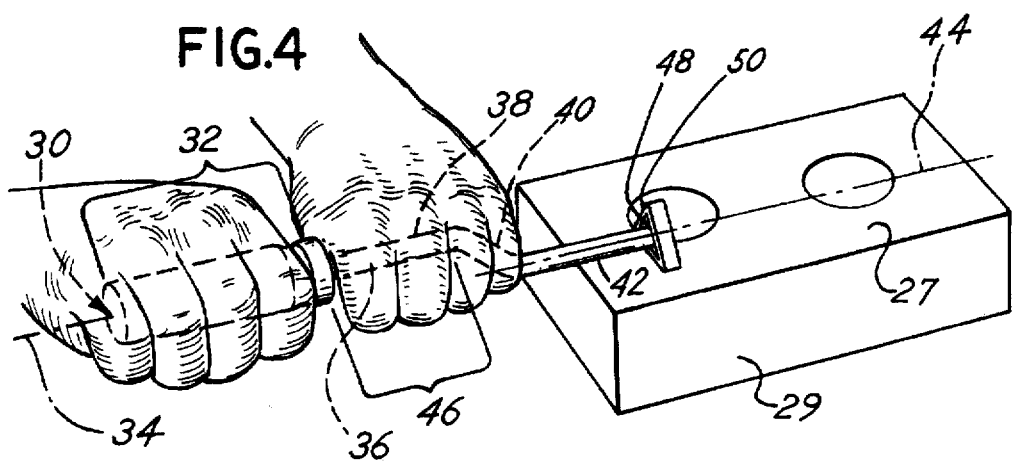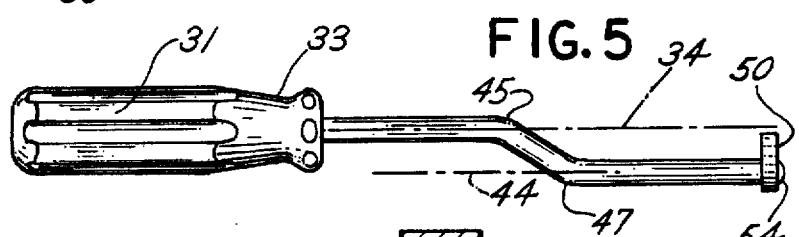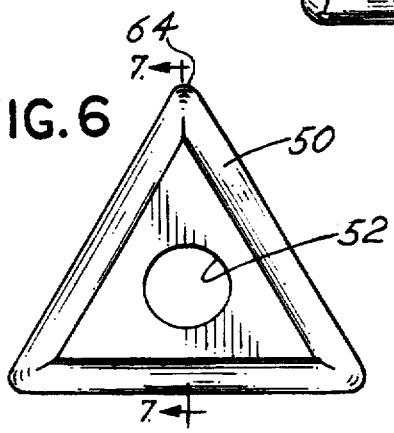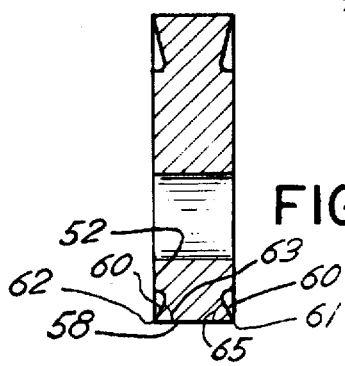

SCRAPING TOOL AND METHOD OF USE

BACKGROUND OF THE INVENTION

This invention relates to a scraping tool and, more particularly, a scraping tool which may be utilized, for example, to scrape cylinder heads and blocks of engines or to remove other contaminant material, such as carbon deposits or the like, from a generally planar surface.

When repairing an automobile engine, it is often necessary to replace the gaskets and seals which are used at the innerface of the component parts of the engine to effect a seal between the parts. For example, when the cylinder head is removed for access to the pistons and repair of the compounds incorporated in the engine block, it is necessary to scrape the old gasket from the cylinder head as well as the block surface so that a new gasket may be positioned thereon. Generally, the surfaces to be scraped are flat, planar surfaces.

Various types of scraping tools have been used in the past to scrape such materials. By way of example, the following tools are known to have been used for such purposes: Lisle Part No. 51000 Heavy Duty Scraper by Lisle Corp., Clarinda, Iowa; TMT Company "Gasket Getter" by TMT Comply, Morro Bay, Calif.; Cal-Van Part No. 350 Heavy Duty Gasket Scraper by Cal-Ban Tools, Inc.; CTA Part No. 2080 Gasket Scraper by CTA Manufacturing Corpo.; K-D Part No. 485 Gasket Scraper by K-D Tools; Old Forge Part Nos. 7241, 7243, 7245, 7039 and 7040 Scrapers by Old Forge Tools, Inc.; Plews Part No. 72-433 Gasket Scraper by Plews Tools, Inc.; Rimac Part No. 2910 Scraper Set by Rimac Tools & Equipment Corp.; and Vim Flexible Carbon Scraper (C1) by Vin Tools, Inc.

There has remained, however, the need for an improved gasket scraper tool. Suggestions have been made to use a carbide blade in conjunction with a tool having the appearance of a hand screw driver wherein the carbide blade is fixed to the shaft of the tool, for example the TMT Company "Gasket Getter" tool. However, rarely is such a tool entirely satisfactory in performance inasmuch as the blade edges of such tools often fracture or break, and thus usefulness of such a tool is not entirely acceptable.

Thus, there has remained the need to provide an improved scraping tool, especially for use to remove gaskets or surface layers of contaminants from generally flat, hard metal surfaces such as cylinder heads and blocks.

SUMMARY OF THE INVENTION

Briefly, the present invention comprises a scraper tool having a handle with a shaft extending from the handle along the centerline axis of the handle, the shaft being divided into two parts; namely, an inner section and an outer section, with the inner section extending along the axis of the handle and the outer section parallel to and spaced radially from that axis. Further, the tool includes a scraper blade at the end of the outer section of the shaft and a fastener for attaching the scraper blade onto the outer section of the shaft. The handle is designed for manual gripping and operation by one hand while the fingers of the other hand of the operator may be placed over the inner section of the shaft to permit manual movement of the scraper over the surface being scraped with two hands simultaneously. Specifically, the blade is moved over that surface, and the scraping edges of the blade effect removal of the gasket or of other contaminants.

Important features of the invention include the construction of the shaft. More particularly, the shaft includes an inner section which is coaxial with the handle and an outer section which is radially spaced from that axis and is connected thereto by an intermediate or a connecting section. This permits the positioning of one hand on the handle of the tool and the fingers of the other hand of an operator comfortably on the shaft of the tool and, in particular, on the inner section of the shaft of the tool to facilitate a grip of the tool and thus effectiveness of a the scraping operation. Another important feature of the invention is the construction of the carbide blade itself. Importantly, the cutting edges of the blade are formed by a first surface, which is generally parallel to the axis of the shaft, and a second surface which forms an acute angle therewith.

Thus, it is an object of the invention to provide an improved scraping tool and an improved method of scraping contaminants and other materials from generally flat, planar surfaces.

A further object of the invention is to provide a scraper tool which enables the operator of the tool to simultaneously utilize both hands so as to enhance mechanical advantage and force that can be applied manually in the operation of the tool as a scraper.

Yet another object of the invention is to provide an improved tool which can be used to scrape gaskets and similar materials from the surfaces of cylinder heads and blocks of engines.

Another object of the invention is to provide an improved scraper tool which includes a blade that can be adjusted and reversed, and wherein multiple cutting edges or scraping edges are provided by the blade.

These and other objects, advantages and features of the invention will be set forth in the detailed description which follows.

BRIEF DESCRIPTION OF THE DRAWING

In the detailed description which follows, reference will be made to the drawing, comprised of the following figures:

FIG. 1 is an isometric view of a prior art scraper that was designed and used for operations other than scraping of cylinder heads and blocks but which is known to have been suggested for use with respect to scraping old gaskets from cylinder heads;

FIG. 2 is a plan view of the scraping member or scraping blade used in combination with the tool of FIG. 1;

FIG. 3 is a cross-sectional view of the blade of FIG. 2 along the line 3—3;

FIG. 4 is an isometric view of the tool of the present invention illustrating the manner of use of the tool;

FIG. 5 is a side elevation of the tool of the invention;

FIG. 6 is a plan view of the scraper blade used in combination with the tool of FIG. 5;

FIG. 7 is a cross-sectional view of the blade of FIG. 6 taken along the line 7—7.

DESCRIPTION OF THE PREFERRED EMBODIMENT

Referring first to FIG. 1 through 3, there is illustrated a prior art scraping tool. The prior art scraping tool is comprised of a handle 10 which has a center line axis 12. A shaft 14 is attached to the handle 10 and extends along the centerline axis 12. A triangular blade or scraping number 16 is affixed to the end of the shaft 14 by means of a fastener 18 such as a screw or bolt. The scraper of FIG. 1 is not typically used for scraping cylinder heads and blocks.

Rather, it is used for other scraping operations, though it is advertised for use to scrape an engine block.

The fastener 18 is removable so that the blade 16 may be changed or rotated as the case may be. Typically, the fastener 18 is utilized only to remove and reverse the blade 16.

FIGS. 2 and 3 illustrate the scraper block or blade 16. The blade 16 is triangular. The scraping surfaces of the blade are defined by a first planar surface 20, which is generally parallel to the axis 12 and a second surface 22, which defines a right angle with respect to the first surface 20. A circumferential groove 24 is defined parallel to each surface 20 on each side of blade 16 to ensure a cutting edge is provided by the surfaces 20 and 22. Groove 24 is spaced from surface 20 by surface 22. A center passage 26 is defined for receipt of the fastener 18 and attachment of blade 16 to the shaft 14.

The improved tool of the present invention is depicted in FIGS. 4–7. FIG. 4 also depicts the method of use of the improved tool of the invention for scraping, by way of example, the flat surface 27 of a block 29 of an automobile engine, upon which a gasket normally resides. FIGS. 5 through 7 depict in greater detail the various component parts and elements of the tool of the invention.

The tool of the invention includes a handle 30, which is generally cylindrical in shape and has an elongate dimension 32. The handle 30 also includes a centerline axis 34. The handle 30 may include various ribs 31 and may be configured with a circumferential groove 33 to facilitate gripping, such as illustrated in FIG. 4 and FIG. 5.

A shaft 36 extends axially from along axis 34 and is connected rigidly and permanently to the handle 30. The shaft 36 includes an inner section 38, a transition section 40 and an outer section 42. The inner section 38 extends coaxially along the axis 34. The outer section 42 is spaced from and generally parallel to the axis 34 and thus defines a second axis, or outer section axis 44. The transition section 40, which connects the inner section 38 and outer section 42, is depicted as having a pair of 45 degree bends 45, 47 to effect the connection. However, any angle of bend 45, 47 desired in the manufacturing process may be utilized.

The radial extent or radial distance between the axis 34 and the axis 44 is approximately equal to and at least about the outside radius of the handle 30. However, greater radial distances may be utilized in the practice of the invention. An important reason for this axial spacing is to permit manual positioning of the fingers of the hand on the inner section 38 of the shaft 36, as depicted in FIG. 4. The inner section 38 has an axial extent or length 46 which is at least 0.5 times the elongate extension 32 of the handle 30. Thus, innersection axial extent 46 is about 0.5 times the handle axial extent 32, but it may be greater than handle axial extent 32. The total axial extent of the shaft 36 is at least one and a half times the axial extension 32 of the handle 30.

Positioned or attached to the outer or distal end 48 of the outer section 42 is a special blade 50. This blade 50 is a carbide scraper blade and defines a block member as more particularly depicted in FIGS. 6 and 7. Thus, the blade 50 defines a block member having the configuration of an equilateral triangle in plan view. The blade 50 includes a center passage or bore 52, through which a fastener 54 in FIG. 5 fits to attach the scraper blade 50 to the distal end 48 of the outer section 42. The scraper blade 50 further includes three planar surfaces 58, which are generally parallel to the axis 44 and which intersect to form an equivalent triangle. The surfaces 58 define a first surface of cutting edges 61 and 62. A second surface 60 makes acute angles 63, 65 with respect to the first surface 58 to define the cutting edges 61 and 62. In practice, the preferred range of the acute angle 63, 65 is 75°±8°. The carbide blade provided American National Carbide Company Style TNMZ432A, Grade C2, is a preferred blade 50 for use in the combination described.

It has been found important to keep the included angle between the surfaces 58 to 60 as an acute angle 63, 65 to enhance the scraping operation and to thereby provide appropriate utility of the tool in the environment; described, namely for scraping cylinder heads and removal of gaskets therefrom, and for similar operations. Further, it has been found that the configuration of the shaft 36, namely having an axial inner section 38 and a parallel, radially spaced outer section 42, is important to permit gripping of the tool simultaneously and by both hands of an operator, as depicted in FIG. 4. This is necessary in order to enhance the force or grip which can be utilized in the scraping operation.

As depicted in FIG. 4, the scraping operation is effected by manual manipulation to permit the edges 61, 62 of the blade 50 to move back and forth, but over the surface 27 being scraped. Thus, the surfaces 58 and 60 of the blade 50 define a cutting or scraping edges 61, 62 which effect the scraping operation. By utilizing the particular configuration of the surfaces 58 and 60, it is possible to efficiently and effectively remove the gasket material and other contaminants.

Note that the fastener 54 may be removed and that the blade 50 may be easily reversed in position on the distal end 48 of the outer section 42 of the shaft 36. Additionally, the fastener 54 may be loosened so that the blade 50 may be rotated and positioned appropriately with distinct edges 61, 62 for scraping. That is, the tool requires, for efficient operation, that there be a degree of alignment of the edges 62 relative to the other component parts. The edges 62 should thus be aligned so that an apex 64 of the blade 50 is aligned with axis 34. Referring to FIG. 5, apex 64 of the blade 50 is generally aligned with the axis 34. This is another preferred and important relationship with respect to the configuration, operation and construction of the tool.

Certain variations and permutations of the construction of the invention may be effected. For example, the acute angle 63, 65 defined by the blade edges may be varied slightly. The relationship of the inner and outer sections 38, 42 may be varied vis-a-vis the length of the handle. The radial distances between the axis of the inner and outer sections 38, 42 may be varied. The angular arrangement of the transitional section 40 may be varied. The blade 50 may be keyed to the shaft by providing appropriate keying elements in the distal end of the shaft 36 and the aperture 52 of the blade 50. Thus, while it has been set forth a preferred embodiment of the invention, it is understood the invention is to be limited only by the following claims and equivalents.

What is claimed is:

1. A scraping tool for removal of surface layers of contaminants from generally flat, hard metal surfaces comprising, in combination:

a handle, said handle being generally cylindrical with a radial dimension and elongate dimension to permit manual gripping, said handle having a center line axis in the elongate direction of the handle;

a shaft extending from the center line axis of the handle, said shaft being elongate in the axial direction at least about 1.5 times the elongated dimension of the handle, said shaft including an inner section adjacent the handle, and an outer section with a distal free end and said outer section also including an inner end connected by a transition section to the inner section, said outer section axially spaced from the handle by the transition section, said transition section axially spaced from the handle at least about 0.5 times the elongate dimension of the handle whereby the inner section of the shaft may be manually gripped simultaneously by fingers of one hand and the handle by fingers of the other hand, the outer section of the shaft defining an axis generally parallel to the inner section and radially spaced from the inner section approximately the radial dimension of the handle;

a scraper blade; and a fastener affixing the blade to the distal end of the outer section of the shaft, said scraper blade comprised of a carbide member having at least two scraping edges, said member further defined by a geometric block attached to the distal end transversely to the axis of the outer section, said block scraping edges also aligned transversely to the outer section axis and defined by a first surface generally parallel to said axis and a second surface forming an acute angle with the first surface.

2. The tool of claim 1 wherein the scraper blade member block is triangular and defines six scraping edges.

3. The tool of claim 1 wherein the fastener is removable to permit adjustment or replacement of the blade.

4. A process for removal of contaminant materials from flat, planar surfaces comprising the steps of:

a) providing a scraping tool including:

a handle, said handle being generally cylindrical with a radius and elongate for manual gripping, said handle having a center line axis in the elongate direction of the handle;

a shaft extending from the center line axis of the handle, said shaft being elongate in the axial direction at least about 1.5 times the elongate extension of the handle, said shaft including an inner section adjacent the handle;

and an outer section with a distal free end and an inner end connected by a transition section, said outer section axially spaced from the handle by the transition section, said transition section axially spaced from the handle at least about 0.5 times the elongate extension of the handle whereby the inner section of the shaft may be manually gripped simultaneously by fingers of one hand and the handle by fingers of the other hand, the outer section of the shaft defining an axis and being generally parallel to the inner section and radially spaced from the inner section approximately the radial distance of the radius of the handle;

a scraper blade; and a fastener affixing the blade to the distal end of the outer section of the shaft, said scraper blade comprised of a carbide steel member having at least two scraping edges, said member further defined by a geometric block attached to the distal end transversely to the axis of the outer section, said block scraping edges also aligned transversely to the outer section axis and defined by a first surface generally parallel to said axis and a second surface forming an acute angle with the first surface;

b) manually positioning the tool with a scraper blade edge against the surface, and with one hand on the handle and the other hand on the inner section; and c) moving the blade over the surface with a scraping motion.

* * * * *